US007882194B2

(12) United States Patent
Lingafelt et al.

(10) Patent No.: US 7,882,194 B2
(45) Date of Patent: Feb. 1, 2011

(54) SYSTEM, METHOD AND PROGRAM FOR MANAGING CHAT SESSIONS

(75) Inventors: Charles S. Lingafelt, Durham, NC (US); David P. Merrill, New Paltz, NY (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 11/360,747

(22) Filed: Feb. 23, 2006

(65) Prior Publication Data

US 2007/0198647 A1  Aug. 23, 2007

(51) Int. Cl.
G06F 15/16 (2006.01)
H04M 3/42 (2006.01)
H04W 40/00 (2009.01)

(52) U.S. Cl. .................. 709/207; 709/204; 709/205; 709/206; 709/227; 709/228; 709/229; 455/416; 455/455

(58) Field of Classification Search ......... 709/204–207, 709/224, 216, 227–229; 370/260, 352, 338; 455/416, 445

See application file for complete search history.

(56) References Cited

U.S. PATENT DOCUMENTS

| 5,987,503 | A | 11/1999 | Murakami | 709/204 |
| 6,081,830 | A | 6/2000 | Schindler | 709/204 |
| 6,400,381 | B1 | 6/2002 | Barrett et al. | 345/758 |
| 6,499,053 | B1 * | 12/2002 | Marquette et al. | 709/204 |
| 6,584,494 | B1 | 6/2003 | Manabe et al. | 709/204 |
| 6,630,944 | B1 | 10/2003 | Kakuta et al. | 345/758 |
| 6,677,968 | B1 * | 1/2004 | Appelman | 715/853 |
| 6,678,673 | B1 | 1/2004 | Eves et al. | 707/3 |
| 6,807,563 | B1 | 10/2004 | Christofferson et al. | |
| 7,245,932 | B2 * | 7/2007 | Florkey et al. | 455/518 |
| 7,383,308 | B1 * | 6/2008 | Groves et al. | 709/206 |

(Continued)

OTHER PUBLICATIONS

Blizzard Entertainment, World of Warcraft User Manual, Copyright 2004, p. 71.*

(Continued)

Primary Examiner—Wing F Chan
Assistant Examiner—Benjamin M Thieu
(74) Attorney, Agent, or Firm—Arthur J. Samodovitz

(57) ABSTRACT

System, method and program product for managing a chat session. A server maintains an identity and list of member(s) of a group that can be added to a chat session, and a list of people authorized to request that the group of member(s) be added to the chat session. A person in a chat session at a workstation makes a request to add the group of member(s) to the chat session. In response, the workstation sends the request to the server. In response to the request, the server determines if the person is authorized to add the group to the chat session. If so, the server sends an invitation to the member(s) to join the chat session. If not, the server does not send an invitation to the member(s) to join the chat session. To make the request to add the group to the chat session, the person can enter in a chat session text field a character string that is a command to add the group to the chat session. A program at the workstation monitors the text field and determines that the character string is the command to add the group to the chat session.

19 Claims, 3 Drawing Sheets

U.S. PATENT DOCUMENTS

| | | | |
|---|---|---|---|
| 2002/0032735 A1* | 3/2002 | Burnstein et al. | 709/204 |
| 2002/0049806 A1* | 4/2002 | Gatz et al. | 709/203 |
| 2002/0124053 A1* | 9/2002 | Adams et al. | 709/216 |
| 2002/0188681 A1 | 12/2002 | Gruen et al. | 709/204 |
| 2003/0154251 A1 | 8/2003 | Manabe et al. | 709/204 |
| 2003/0220972 A1* | 11/2003 | Montet et al. | 709/204 |
| 2004/0111479 A1 | 6/2004 | Borden et al. | 709/206 |
| 2005/0004984 A1 | 1/2005 | Simpson | 709/205 |
| 2005/0010641 A1 | 1/2005 | Staack | 709/206 |
| 2007/0060131 A1* | 3/2007 | Wilson | 455/445 |

OTHER PUBLICATIONS

Desire2Learn, Mojo Chat Instructor Guide (Mojo Chat/Canvas 3.1 (for D2L 7.3)), Oct. 26, 2004, Copyright 2004, pp. 15-23.*

* cited by examiner

SYSTEM, METHOD AND PROGRAM FOR MANAGING CHAT SESSIONS

FIELD OF THE INVENTION

The invention relates generally to computer systems, and more specifically to network "chat" sessions.

BACKGROUND OF THE INVENTION

"Chat" sessions are well known today, and available via Internet Service Providers and other companies. Typically, there is a server program and a client program that enable the chat sessions. Examples of existing chat session programs are IBM Sametime instant messaging program, Microsoft MSN Messenger, Microsoft Windows Messenger, Yahoo Instant Messenger, and AOL Instant Messenger. To set up a chat session, one person at a workstation checks if another person is currently "on line" at another computer. If so, the one person selects the other person and then types a message into a chat session text field on the one person's workstation. In response, the workstation of the one person sends the message to the workstation of the other person where it appears in a text field on the workstation of the other person prefaced by the name of the one person. The other person can respond simply by typing into another text field that the workstation provides for a response, and the response is sent to and appears in a text field on the workstation of the one person prefaced by the name of the other person. The foregoing process can continue, with other messages being sent by either person, as long the chat session persists. The exchange of messages is essentially real time. Each person can also add one or more other people to the chat session by selecting their name from a list of individuals or groups (sometimes called a "buddy list") that the person previously designated for potentially adding to chat sessions. The list is typically maintained on the person's own workstation, and cannot be accessed from any other person's workstation. The selection of a person or group from the list to add to the chat session is made using a mouse and cursor to select the individual or group from the list. A person can also add another person to the chat session by looking up the other person in a directory, and then selecting the other person from the directory. After being added to a chat session, any person so added can likewise type a message in a text field on their workstation, and the message will appear, prefaced by the name of the sender, on the workstations of all other people in the chat session.

While the foregoing chat session functions are effective in communicating the messages in real time and adding people to a chat session, it would be advantageous to simplify the process of adding people to a chat session while maintaining requisite security.

Accordingly, an object of the present invention is to simplify the process of adding people to a chat session while maintaining an effective level of security.

SUMMARY OF INVENTION

The present invention resides in a system, method and program product for managing a chat session. A server maintains an identity and list of member(s) of a group that can be added to a chat session, and a list of people authorized to request that the group of member(s) be added to the chat session. A person in a chat session at a workstation makes a request to add the group of member(s) to the chat session. In response, the workstation sends the request to the server. In response to the request, the server determines if the person is authorized to add the group to the chat session. If so, the server sends an invitation to the member(s) to join the chat session. If not, the server does not send an invitation to the member(s) to join the chat session.

According to features of the present invention, to make the request to add the group to the chat session, the person enters in a chat session text field a character string that is a command to add the group to the chat session. A program at the workstation monitors the text field and determines that the character string is the command to add the group to the chat session. In response, a command is sent to the server to add the group to the chat session. By way of example, the character string comprises an identity of the group surrounded by symbols which differentiate the character string from message text.

DETAILED DESCRIPTION OF THE PREFERRED EMBODIMENTS

Figure 1:
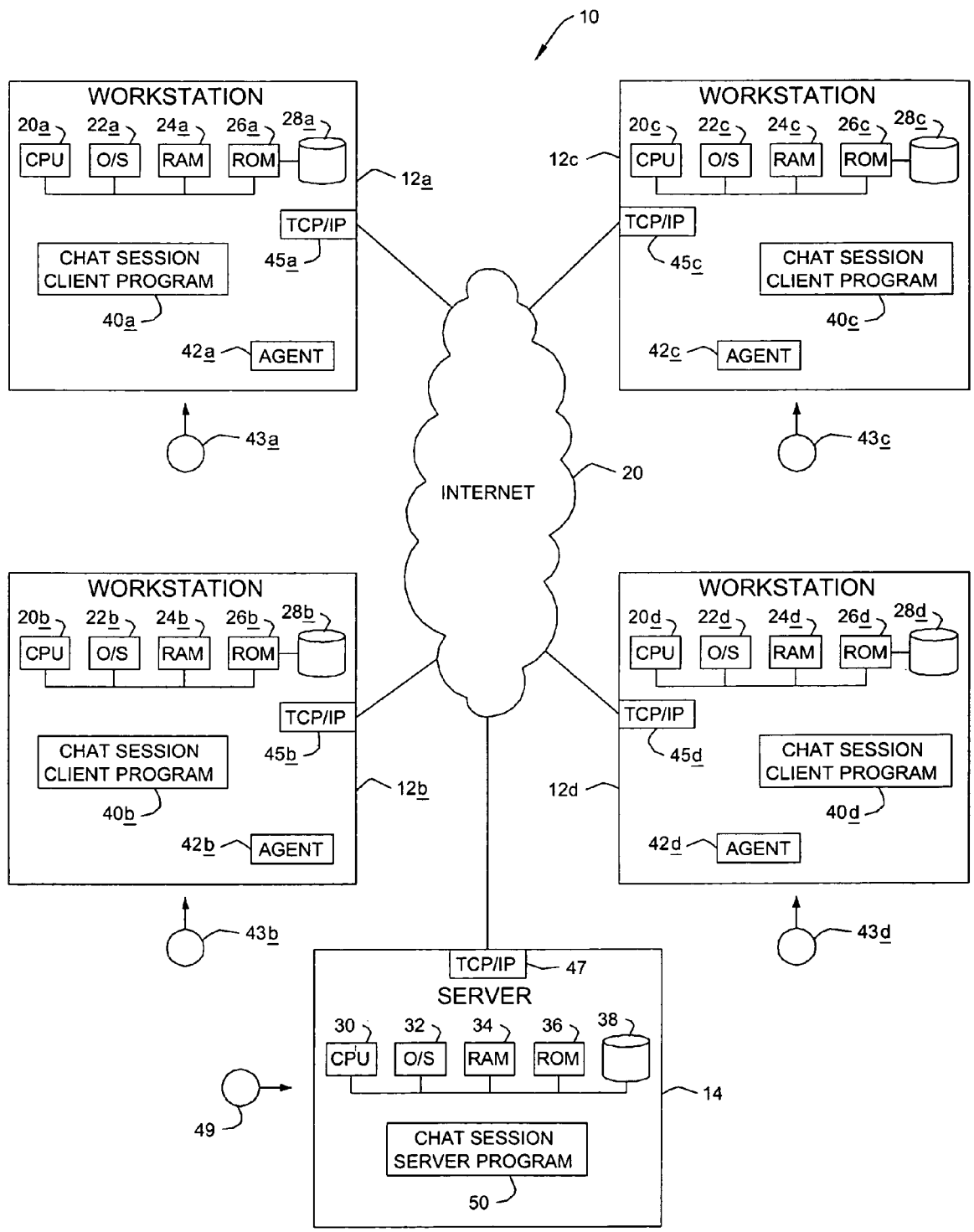
FIG. 1 is a block diagram of a distributed computer system including chat session client programs, intelligent agent programs and a chat session server program which incorporate the present invention.

The present invention will now be described in detail with reference to the figures. FIG. 1 illustrates a distributed computer system generally designated 10. System 10 comprises workstations 12a,b,c,d and a server 14 interconnected via the Internet 20. The workstations 12a,b,c,d include respective CPUs 20a,b,c,d, operating systems 22a,b,c,d, RAMs 24a,b,c,d, ROMs 26a,b,c,d and storages 28a,b,c,d, according to the prior art. Server 14 likewise includes a CPU 30, operating system 32, RAM 34, ROM 36 and storage 38, according to the prior art. Workstations 12a,b,c,d also include respective chat session client programs 40a,b,c,d. Chat session client programs 40a,b,c,d include known chat session client functions to allow one person at any of the workstations to initiate a chat session with another person at any of the other workstations, by selecting the name of the other person from a list previously defined by the one person or "looked-up" from a directory, and then typing a message for the other person. The other person can respond by typing a responsive message. Either person can add another person to the chat session in the same manner as the first person was added. Chat session client programs 40a,b,c,d also include new chat session client functions to add a group of (one or more) people to the chat session by typing a command in the text field to identify the group and the request to add them to the chat session, according to the present invention. The group was predefined, and the name and identities of the members of the group are maintained at the server 14. Because the groups are maintained at the server 14, this allows any workstation (whose user knows the group name) to request that the group be added to a chat session. (If the user is authorized, then the group will be added to the chat session.) Preferably, the group name identifies the expertise or interest of the member(s) of the group. For example, a group of people interested in computer viruses can be named "virus" group. Preferably, the command to add this group to the chat session comprises the name of the group within predefined, characters, such as exclamation points. In this example, the command to add the virus group to the chat session could be !virus!. It is also possible that workstations 12a,b,c,d can include icons to represent the groups that can be added to a chat session. In such a case, the server 14 would provide the icons to the workstations because the groups are maintained at the server. Client programs 40a,b,c,d also include intelligent agent (or "bot") programs 42a,b,c,d to monitor the text field of the respective workstations looking for entries surrounded by the predefined characters, such as exclamation points, and upon finding such an entry, sending the command to server 14. Server 14 includes a chat session server program 50. Chat session server program 50 includes known chat session server functions to maintain a list of participants of each chat session, and route messages from each initiating participant/workstation to the other participants of the chat session. Thus, when any participant of a chat session enters a message into his or her chat session text field of their client workstation, the workstation (under control of program 40a,b,c or d) forwards the message to server 14. In response, program 50 identifies the other participants in the chat session based on the identity of the chat session, and the addresses of their workstations. Then, server 14 forwards the chat session message to these other participants/workstations. Chat session server program 50 also includes new chat session server functions according to the present invention to respond to the commands sent by the workstations to add a group to the chat session. Program 50 responds to these commands by checking if the sender, i.e. the person logged onto the workstation that sent the command, is identified in a list of people authorized to invite this group of people to a chat session. This prevents unauthorized people, such as hackers, from wantonly inviting this group of people into a chat session, adding unwanted people to the chat session and wasting the time of the people added. If the person that sent the command is authorized to add the group to the chat session, then the chat session server program 50 adds the group to the chat session, so they can see the messages sent by other people in the chat session and send their own messages to the other people in the chat session.

Figure 2:
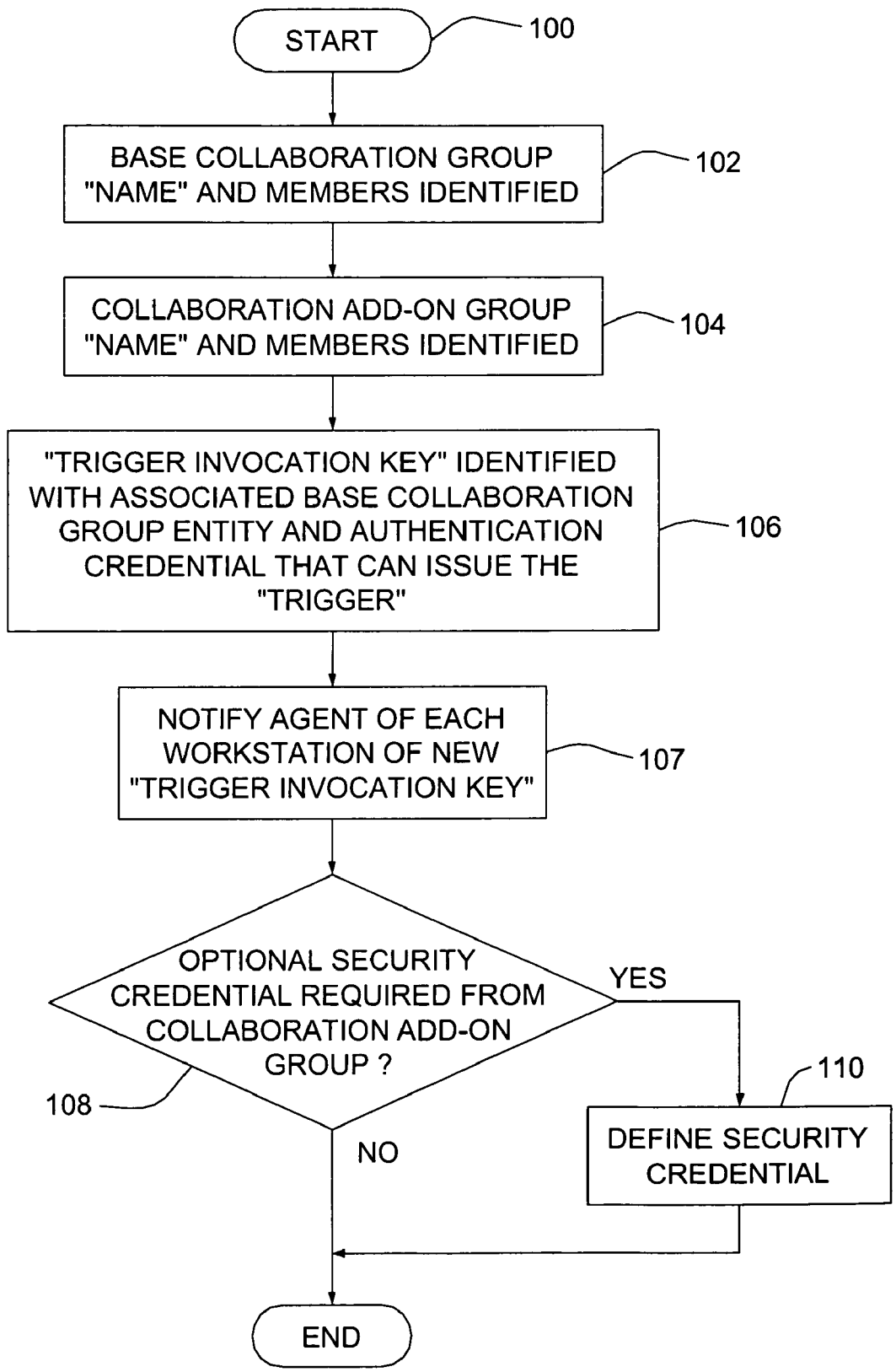
FIG. 2 is a flow chart of a set-up phase for the chat session server program and the chat session client programs of FIG. 1.

FIG. 2 illustrates, in more detail, a set-up phase for chat session server program 50 and chat session client programs 40a,b,c,d. In step 100, a person at server 14 or a remote workstation invokes chat session server program 50 and authenticates himself or herself with a UserID and password. (Alternately, a person at any of workstations 12a,b,c,d can invoke chat session server program 50 via the respective chat session client program 40a,b,c,d.) Next, the person identifies to program 50 a "base collaboration group" by name and members (step 102). As explained below, the members of the base collaboration group are authorized to invite "add-on" groups to join a chat session in which the member is currently a participant, by sending a command to server 14. Next, the person identifies to program 50 one or more permitted "add-on" groups by name and members of each group (step 104). For example, the person can identify an "add-on" group called "virus", and identify people in this group who are interested in chat sessions about viruses. Such people can be systems' administrators responsible for security. Next, the person identifies to program 50 a unique "trigger invocation key" for each add-on group which is the command (i.e. text and symbols or other characters which surround the text) to send to server 14 to invite the add-on group to the chat session (step 106). For each trigger invocation key, the person also identifies to program 50 which base collaboration group of members are authorized to send the trigger invocation key (to add the corresponding add-on group to the chat session). In response to the identification of trigger invocation key, the collaboration group and corresponding add-on group, chat session server program 50 sends a request to intelligent agent or "bot" programs (such as programs 42a,b,c,d) of the workstations in the collaboration group to monitor a chat session text field looking for the command to invite the add-on group to a chat session (step 107). In response, the intelligent agent program on each workstation adds the trigger invocation key to a list of trigger invocation keys for which to scan chat session text fields on the workstation. Next, the person optionally identifies security credentials required from the members of the base collaboration group for the server to act upon a command by the members of the base collaboration group to invite the members of the corresponding add-on group (decision 108 and step 110). Such credentials may include Username and Password, digital certificate, token, pass phrase, chat systems assigned ID, physical attributes of the system the user is using, such as the system's processor serial number, the system's network interface component media access address (MAC address). These credentials may be used singly or in combination with each other.

Figure 3:
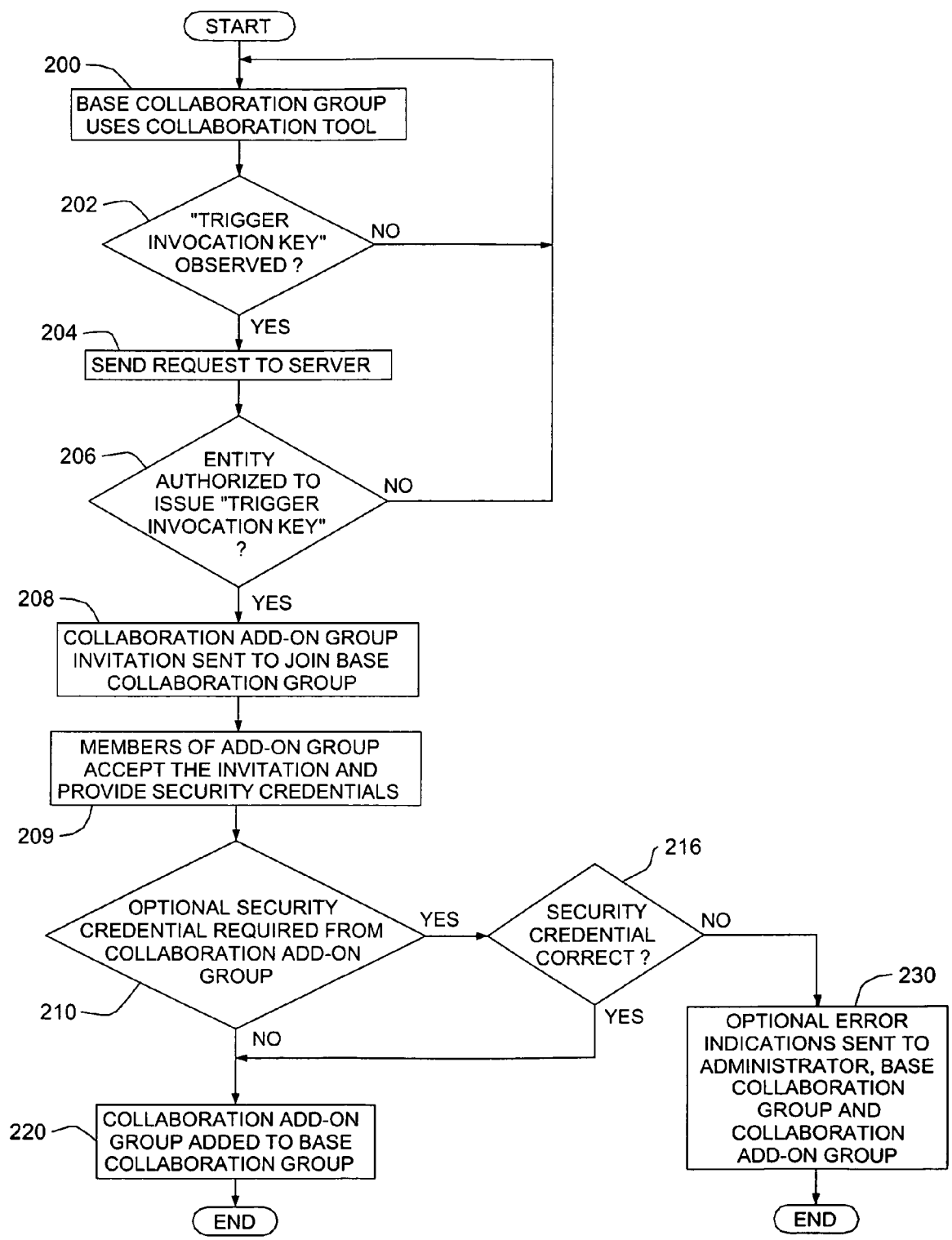
FIG. 3 is a flow chart of a chat session phase of the chat session server program, an intelligent agent program and chat session client programs of FIG. 1.

FIG. 3 illustrates, in more detail, a collaboration or chat session phase of chat session server program 50 and chat session client programs 40a,b,c,d. In step 200, two or more people are engaged in a chat session using the standard functions of chat session client program 40a,b,c,d and chat session server program 50. Next, one of the people currently engaged in the chat session enters, in the text field of his or her workstation's chat session display, a command to add a specified "add-on" group. (Alternately, the person selects an icon defined by server 14 and displayed on the workstation of the person. The icon represents the add-on group, and when selected by the person, will cause the program 40a,b,c or d to send the command to server 14 to invite the add-on group.) For example, the command can be !virus! which is intended to add to the chat session an add-on group named "virus". In response, the intelligent agent program 42a,b,c or d of the person's workstation detects that a trigger invocation key has been entered into the chat session text field (decision 202). The intelligent agent program 42a,b,c or d detects the trigger invocation key by matching the character string of the trigger invocation key to the list of character strings for which chat session server program 50 has previously instructed the intelligent agent program 41a,b,c or d to monitor. Upon detecting the trigger invocation key, the intelligent agent program 42a, b,c or d sends a request to the chat session server program 50 to invite the add-on group to the chat session (step 204). This request includes the name of the add-on group, the name of the person who sent the request, whether a credentials prompt is needed and the name of the add-on group for context purposes. In response, the chat session server program 50 determines if the person that sent the request was authorized to make the request (by entering the trigger invocation key command in the chat session text field) (decision 206). Chat session server program 50 makes this determination by comparing the name of the requester to a list of people authorized to request to invite the add-on group to the chat session, as entered in steps 102-106. If the requester is authorized, the chat session server program 50 sends an invitation to each member of the add-on group to join the chat session (step 208). If the member is logged-on, usually the member will accept the invitation, and provide security credentials if required to accept the invitation (step 209). Next, chat session server program 50 determines from its configuration file whether optional security features were specified in decision 108 (decision 210). If not (decision 210, no branch), then chat session server program 50 joins each of the members of the add-on group that accepted the invitation to the chat session with the others already in the chat session (step 220). Chat session server program 50 joins these members by extending an invitation to join the chat session. Referring again to decision 210, yes branch, where optional security features were specified in decision 108, chat session server program 50 determines if the security credential supplied by each member of the add-on group are valid (decision 216). If so, then chat session server program 50 joins the member of the add-on group to the chat session (step 220). If not, then the chat session server program 50 sends an error message to the person who set up the add-on group, the member of the add-on group that did not supply the proper credentials, and the member of the base collaboration group that sent the request to invite the members of the add-on group to the current chat session (step 230).

Chat session client program 40$a,b,c,d$ and intelligent agent programs 42$a,b,c,d$ can be loaded into workstations 12$a,b,c,d$ from a computer readable media 43$a,b,c,d$ such as magnetic disk or tape, optical disk, DVD, etc. or downloaded from the Internet via TCP/IP adapter cards 45$a,b,c,d$. Chat session server program 50 can be loaded into server 14 from a computer readable media 49 such as magnetic disk or tape, optical disk, DVD, etc. or downloaded from the Internet via TCP/IP adapter cards 47.

Based on the foregoing, system, method and program for managing chat sessions have been disclosed. However, numerous modifications and substitutions can be made without deviating from the scope of the present invention. For example, program 50 can maintain a cache history of chat transcript since the trigger key was invoked, and this history can be presented to a person added to the chat session upon his or her request. Therefore, the present invention has been disclosed by way of illustration and not limitation, and reference should be made to the following claims to determine the scope of the present invention.

What is claimed:

1. A method for managing a chat session, the method comprising the steps of:
   a server storing in a database an identity of a group, a list of a plurality of members of the group, and a list of people authorized to request that the group of members be added to the chat session;
   the server receiving a request from a workstation of a person participating in the chat session to add the group of members to the chat session, the request initiated by the person participating in the chat session at the workstation, the request specifying the identity of the group but not the members of the group;
   in response to the request initiated by the person participating in the chat session at the workstation, the server determining if the person which initiated the request is authorized to add the group of members to the chat session, and if so, the server determining from the database identities of members of the group and sending an invitation to the members of the group to join the chat session, and if not, the server not sending an invitation to the members of the group to join the chat session in response to the request initiated by the person participating in the chat session at the workstation;
   the workstation receiving from the person which initiated the request entry in a chat session message text field of a character string to add the group of members to the chat session; and
   a program stored in a computer readable storage device and executing at the workstation monitoring the chat session message text field and determining that the character string is the request to add the group of members to the chat session, and in response, the program forming and initiating sending of the request to the server to add the group of members to the chat session; and wherein the character string comprises an identity of the group of members surrounded by symbols which differentiate the character string from chat message text in the chat message text field.

2. The method of claim 1 wherein in response to the request to add the members of the group to the chat session further comprising the steps of:
   the server obtaining from the members of the group a credential and determining if the credential is valid, and if so, joining the members of the group to the chat session.

3. The method of claim 1 wherein if the person which initiated the request to add the members of the group to the chat session is authorized to add the members of the group to the chat session, and the server sends an invitation to the members of the group to join the chat session, further comprising the steps of:
   the members of the group responding to the server with acceptances to join the chat session; and
   the server joining the members of the group to the chat session.

4. The method of claim 1 wherein none of the members of the group is participating in the chat session when the person which initiated the request to add the group of members to the chat session made the request to add the group of members to the chat session.

5. The method of claim 1 further comprising the prior step of another workstation establishing the group at the server by specifying to the server via a network the identity of the group and the list of the plurality of members of the group.

6. A method for managing a chat session, the method comprising the steps of:
   a server receiving a request from a workstation of a person participating in the chat session to add a group of members to the chat session, the request initiated by the person participating in the chat session at the workstation, the request specifying an identity of the group but not the members of the group;
   in response to the request initiated by the person participating in the chat session at the workstation, the server determining if the person which initiated the request is authorized to add the group of members to the chat session, and if so, the server determining from a database identities of members of the group and sending an invitation to the members of the group to join the chat session, and if not, the server not sending an invitation to the members of the group to join the chat session in response to the request initiated by the person participating in the chat session at the workstation;
   the server receiving another request from another workstation of another person participating in another chat session to add the group of members to the other chat session, the request initiated by the other person participating in the other chat session at the other workstation, the other request specifying the identity of the group but not the members of the group; and
   in response to the other request initiated by the other person participating in the other chat session at other workstation, the server determining if the other person which initiated the other request is authorized to add the group of members to the other chat session, and if so, the server determining from the database identities of members of the group and sending an invitation to the members of the group to join the other chat session, and if not, the server not sending an invitation to the members of the group to join the other chat session in response to the other request initiated by the other person participating in the other chat session at the other workstation.

7. The method of claim 6 wherein the database is accessible by the server, and the database includes the identity of the group, a list of the members of the group, and a list of people authorized to request that the group of members be added to a chat session.

8. A computer program product for managing a chat session, the computer program product comprising:
a computer readable storage device;
first program instructions to direct storage in a database of an identity of a group, a list of a plurality of members of the group, and a list of people authorized to request that the group of members be added to the chat session;
second program instructions to receive a request from a workstation of a person participating in the chat session to add the group of members to the chat session, the request initiated by the person participating in the chat session at the workstation, the request specifying the identity of the group but not the members of the group; and
third program instructions, responsive to the request initiated by the person participating in the chat session at the workstation, to determine if the person which initiated the request is authorized to add the group of members to the chat session, and if so, determine from the database identities of members of the group and send an invitation to the members of the group to join the chat session, and if not, not send an invitation to the members of the group to join the chat session in response to the request initiated by the person participating in the chat session at the workstation;
fourth program instructions, for execution in the workstation, to receive from the person which initiated the request, entry in a chat session message text field of a character string to add the group of members to the chat session; and
fifth program instructions, for execution in the workstation, to monitor the chat session message text field and determine that the character string is the request to add the group of members to the chat session, and in response, form and initiate sending of the request to the server to add the group of members to the chat session; and wherein
the character string comprises an identity of the group of members surrounded by symbols which differentiate the character string from chat message text in the chat message text field; and wherein
the first, second, third, fourth and fifth program instructions are stored on the computer readable storage device.

9. The computer program product of claim 8 further comprising sixth program instructions, responsive to the request to add the members of the group to the chat session, to obtain from the members of the group a credential and determine if the credential is valid, and if so, join the members of the group to the chat session; and wherein the sixth program instructions are stored on the computer readable storage device.

10. The computer program product of claim 8 wherein the first, second and third program instructions are configured for execution at a server; and further comprising:
sixth program instructions, for execution at respective workstations of the members of the group, to respond to the server with acceptances to join the chat session; and
seventh program instructions, configured for execution at the server, responsive to the acceptances to join the chat session, to join the members of the group to the chat session; and wherein
the sixth and seventh program instructions are stored on the computer readable storage device.

11. The computer program product of claim 8 wherein none of the members of the group is participating in the chat session when the person which initiated the request to add the group of members to the chat session made the request to add the group of members to the chat session.

12. The computer program product of claim 8 wherein the first and second program instructions are configured for execution at a server; and further comprising fifth program instructions for execution at another workstation to establish the group at the server by specifying to the server via a network the identity of the group and the list of the plurality of members of the group; and wherein
the fifth program instructions are stored on the computer readable storage device.

13. A computer program product for managing a chat session, the computer program product comprising:
a computer readable storage device;
first program instructions to receive a request from a workstation of a person participating in the chat session to add a group of members to the chat session, the request initiated by the person participating in the chat session at the workstation, the request specifying an identity of the group but not the members of the group; and
second program instructions, responsive to the request initiated by the person participating in the chat session at the workstation, to determine if the person which initiated the request is authorized to add the group of members to the chat session, and if so, determine from a database identities of members of the group and send an invitation to the members of the group to join the chat session, and if not, not send an invitation to the members of the group to join the chat session in response to the request initiated by the person participating in the chat session at the workstation;
third program instructions to receive another request from another workstation of another person participating in another chat session to add the group of members to the other chat session, the request initiated by the other person participating in the other chat session at the other workstation, the other request specifying the identity of the group but not the members of the group; and
fourth program instructions, responsive to the other request initiated by the other person participating in the other chat session at the other workstation, to determine if the other person which initiated the other request is authorized to add the group of members to the other chat session, and
if so, determine from the database identities of the members of the group and send an invitation to the members of the group to join the other chat session, and
if not, not send an invitation to the members of the group to join the other chat session in response to the other request initiated by the other person participating in the other chat session at the other workstation; and wherein
the first, second, third and fourth program instructions are stored on the computer readable storage device.

14. The computer program product of claim 13 wherein:
the first, second, third and fourth program instructions are configured for execution in a server computer, the database is accessible by the server computer, and the database includes the identity of the group, a list of the members of the group, and a list of people authorized to request that the group of members be added to a chat session; and the second program instructions determine if the person which initiated the request is authorized to add the group of members to the chat session by querying the database.

15. A computer system for managing a chat session, the computer system comprising:

a server including a CPU, a computer readable memory, and a computer readable storage device;

first program instructions to receive a request from a workstation of a person participating in the chat session to add a group of members to the chat session, the request initiated by the person participating in the chat session at the workstation, the request specifying the identity of the group but not the members of the group; and second program instructions, responsive to the request initiated by the person participating in the chat session at the workstation, to determine if the person which initiated the request is authorized to add the group of members to the chat session, and if so, determine from a database identities of members of the group and send an invitation to the members of the group to join the chat session, and if not, not send an invitation to the members of the group to join the chat session in response to the request initiated by the person participating in the chat session at the workstation; and wherein the first and second program instructions are stored on the computer readable storage device for execution by the CPU via the computer readable memory; and the workstation includes a second CPU, a second computer readable memory and a second computer readable storage device; and further comprising:

third program instructions to receive from the person which initiated the request, entry in a chat session message text field of a character string to add the group of members to the chat session; and fourth program instructions to monitor the chat session message text field and determine that the character string is the request to add the group of members to the chat session, and in response, form and initiate sending of the request to the server to add the group of members to the chat session; and wherein the character string comprises an identity of the group of members surrounded by symbols which differentiate the character string from chat message text in the chat message text field; and the third and fourth program instructions are stored on the second computer readable storage device for execution by the second CPU via the second computer readable memory.

16. The computer system of claim 15 wherein none of the members of the group is participating in the chat session when the person which initiated the request to add the group of members to the chat session made the request to add the group of members to the chat session.

17. A server computer for managing a chat session, the server computer comprising:

a CPU, a computer readable memory, and a computer readable storage device;

first program instructions to receive a request from a workstation of a person participating in the chat session to add a group of members to the chat session, the request initiated by the person participating in the chat session at the workstation, the request specifying an identity of the group but not the members of the group;

second program instructions, responsive to the request initiated by the person participating in the chat session at the workstation, to determine if the person which initiated the request is authorized to add the group of members to the chat session, and if so, determine from the database identities of members of the group and send an invitation to the members of the group to join the chat session, and if not, not send an invitation to the members of the group to join the chat session in response to the request initiated by the person participating in the chat session at the workstation;

third program instructions to receive another request from another workstation of another person participating in another chat session to add the group of members to the other chat session, the request initiated by the other person participating in the other chat session at the other workstation, the other request specifying the identity of the group but not the members of the group; and fourth program instructions, responsive to the other request initiated by the other person participating in the other chat session at the other workstation, to determine if the other person which initiated the other request is authorized to add the group of members to the other chat session, and if so, determine from the database identities of the members of the group and send an invitation to the members of the group to join the other chat session, and if not, not send an invitation to the members of the group to join the other chat session in response to the other request initiated by the other person participating in the other chat session at the other workstation; and wherein the first, second, third and fourth program instructions are stored on the computer readable storage device for execution by the CPU via the computer readable memory.

18. The server computer of claim 17 further comprising:

another workstation including a third CPU, a third computer readable memory, and a third computer readable storage device; and fifth program instructions to establish the group at the server by specifying to the server via a network the identity of the group and the list of the members of the group; and wherein the fifth program instructions are stored on the third computer readable storage device for execution by the third CPU via the third computer readable memory.

19. The server computer of claim 17 wherein:

the database is accessible by the server computer, and the database includes the identity of the group, a list of the members of the group, and a list of people authorized to request that the group of members be added to a chat session; and the second program instructions determine if the person which initiated the request is authorized to add the group of members to the chat session by querying the database.

* * * * *